United States Patent
Organek et al.

[11] Patent Number: 5,964,330
[45] Date of Patent: *Oct. 12, 1999

[54] BALL RAMP DRIVELINE CLUTCH ACTUATOR WITH SELF ALIGNING CONE CLUTCH

[75] Inventors: Gregory J. Organek, Detroit; David M. Preston, Clarkston, both of Mich.

[73] Assignee: Eaton Corporation, Cleveland, Ohio

[*] Notice: This patent is subject to a terminal disclaimer.

[21] Appl. No.: 08/940,240

[22] Filed: Sep. 30, 1997

[51] Int. Cl.$^6$ .............. F16D 13/04; F16D 23/00; F16D 19/00

[52] U.S. Cl. .............. 192/35; 192/93 A; 192/84.7; 192/54.52

[58] Field of Search ............... 192/35, 84 B, 192/93 A, 84.7, 48.2, 54.52, 70.23

[56] References Cited

U.S. PATENT DOCUMENTS

| | | |
|---|---|---|
| 1,974,390 | 9/1934 | Eason . |
| 2,861,225 | 11/1958 | Mergen . |
| 2,937,729 | 5/1960 | Sperr, Jr. . |
| 3,000,479 | 9/1961 | Mosbacher . |
| 4,805,486 | 2/1989 | Hagiwara et al. . |
| 5,078,249 | 1/1992 | Botterill . |
| 5,092,825 | 3/1992 | Goscenski . |
| 5,269,730 | 12/1993 | Hirota ............... 192/84 B X |
| 5,441,137 | 8/1995 | Organek et al. . |
| 5,465,819 | 11/1995 | Weilant et al. ............ 195/35 |
| 5,469,948 | 11/1995 | Organek et al. . |
| 5,485,904 | 1/1996 | Organek et al. . |
| 5,505,285 | 4/1996 | Organek . |
| 5,620,072 | 4/1997 | Engle ...................... 192/35 |

*Primary Examiner*—Charles A. Marmor
*Assistant Examiner*—Roger Pang
*Attorney, Agent, or Firm*—Loren H. Uthoff Jr.; Howard D. Gordon

[57] ABSTRACT

A vehicle driveline clutch using a ball ramp actuator supplying a clamping force on a clutch disc in response to an electromagnetic field where the clutch clamping force is maintained and increased with clutch slip using a plurality of one-way clutches acting in a pair of planetary gearsets with a one-way clutch acting on each planet gear and supported on a carrier ring which is frictionally connected to a ball ramp control ring upon energization by a clutch coupling with an electrical coil thereby creating relative rotational motion between the control ring and an actuation ring causing a plurality of rotational elements to travel along identical opposed variable depth ramps thereby creating an axial separation force between the control ring and the actuation ring generating the clamping force on the clutch disc. The clutch coupling includes a cone clutch where the clutch extension portion of the cone clutch has a plurality of drive flanges thereon that engage mating drive channels formed in the control ring to transfer rotational motion from an output element to the control ring through the clutch coupling without misalignment of the cone clutch.

3 Claims, 3 Drawing Sheets

BALL RAMP DRIVELINE CLUTCH ACTUATOR WITH SELF ALIGNING CONE CLUTCH

RELATED APPLICATIONS

The present application relates to application U.S. Ser. No. 08,941,360 filed on Sep. 30, 1997 entitled Ball Ramp Driveline Clutch Actuator With Unidirectional Apply Using Planetary Gearsets" with Attorney Reference No. 97-RTRN-240 and "Ball Ramp Driveline Clutch Actuator With Unidirectional Apply" with Attorney Reference No. 97-RTRN-477 both assigned to the same assignee, Eaton Corporation, as this application.

BACKGROUND OF THE INVENTION

1. Field of the Invention

The present invention relates to a vehicle driveline clutch and, more particularly, to a driveline clutch where a friction disc is clamped to an engine flywheel using a ball ramp actuator wherein planetary gearsets having one-way clutches on the planetary gears provide driveline clutch lock-up under both drive and coast conditions.

2. Description of the Prior Art

Driveline master clutches commonly use a plurality of springs to clamp a friction disc to an engine flywheel. The springs are disposed within a pressure plate assembly which is bolted to the flywheel. A mechanical linkage that controls the pressure plate spring mechanism is displaced by the operator to control the lock-up and release of the driveline clutch.

Efforts to automate the operation of the driveline clutch using electronics are currently underway. It is known to use an electromechanical or hydraulic actuator connected to the mechanical linkage to, in essence, replace the operator for more accurate clutch operation during transmission shifting. Using such an actuator, the mechanical linkage is moved in response to an electrical control signal generated by a central microprocessor used to process a variety of vehicle sensor inputs based on operating conditions to determine when and in what manner the driveline clutch should be activated or deactivated.

The use of a ball ramp actuator to load a clutch pack in a vehicle driveline differential is known. U.S. Pat. Nos. 4,805,486 and 5,092,825, the disclosures of which are hereby incorporated by reference, disclose limited slip differentials where a clutch pack is loaded in response to the activation of a ball ramp actuator initiated by rotation of a servo motor or a solenoid driven brake shoe on an activation ring. The advantage of the ball ramp mechanism over other actuators is that it converts rotary motion into axial motion with very high force amplification, often 100:1 or greater. A ball ramp actuator has also been utilized in a vehicle transmission to engage and disengage gearsets by loading a gear clutch pack in response to a signal as disclosed in U.S. Pat. No. 5,078,249, the disclosure of which is hereby incorporated by reference.

In both of these vehicle applications, one side of the ball ramp actuator, commonly called a control ring, reacts against case ground through the force induced by an electromagnetic field generated by a coil or is rotated by an electric motor relative to case ground. To generate greater clamping forces, the electrical current supplied to the coil or motor is increased thereby increasing the reaction of the control ring to case ground which rotates the control ring relative to an actuation ring thereby causing rolling elements to traverse ramps in the control and actuation ring which increase the axial movement and clamping force on the clutch pack.

It is also known to use a ball ramp actuator to load a vehicle driveline clutch as disclosed in U.S. Pat. Nos. 1,974,390; 2,861,225; 3,000,479; 5,441,137; 5,469,948; 5,485,904 and 5,505,285, the disclosures of which are hereby incorporated by reference. One problem with the use of a ball ramp actuator to supply the vehicle driveline clutch clamping force is that the mechanics of prior art unidirectional ball ramp mechanisms result in a loss of clamping force when the vehicle is in a coast mode. Once the engine power is reduced and the driveline is actually overrunning the engine (coast mode), the prior art ball ramp actuator with single ramp unidirectional actuation will disengage the clutch thereby eliminating engine braking of the vehicle.

A ball ramp actuated clutch using a unidirectional ball ramp having only a single ramp angle, will cause the clutch to disengage when the engine is not supplying rotational energy into the transmission such as when the vehicle is coasting. When coasting, the flywheel is no longer supplying rotational energy to either the transmission or to the ball ramp actuator. In this circumstance, the relative rotation of the actuation ring and control ring has been reversed such that the ball ramp axial displacement is collapsed thereby allowing the pressure plate to pull away from the clutch disc. The result is that the engine is disengaged from the transmission and any engine braking effect is eliminated.

A bidirectional ball ramp actuated clutch is disclosed in U.S. Pat. Nos. 2,937,729 and 5,505,285. Using this more expensive and complicated technology, the ball ramp actuator incorporates bidirectional ramps which provide activation when there is relative rotation between the control ring and the actuation ring in either direction. However, the ball ramp must transition through the nonactivated state which will result in temporary undesirable clutch slippage and, in addition, the components are more expensive to fabricate than a unidirectional unit. Also, a bidirectional ball ramp will have reduced rotational travel between the control ring and the actuation ring in a given package size as compared to a unidirectional ball ramp mechanism. Thus, a unidirectional ball ramp mechanism is preferred if it can be made to activate in both vehicle drive and coast operating modes.

The ball ramp actuator comprises a plurality of rolling elements, a control ring and an opposed actuation ring where the actuation ring and the control ring define at least three opposed single ramp surfaces formed as circumferential semi-circular grooves, each pair of opposed grooves containing one rolling element. A thrust bearing is interposed between the control ring and a housing member, rotating with and connected to the input member such as a flywheel. An electromagnetic coil is disposed adjacent to one element of a control clutch so as to induce a magnetic field that loads the control clutch which in turn applies a force on the control ring of the ball ramp actuator. The control clutch can be similar to those commonly used for vehicle air conditioning compressors, or a cone type control clutch to increase the transmitted actuation force.

SUMMARY OF THE INVENTION

The present invention is characterized by a flywheel (input element) driven by a prime mover and a transmission input shaft (output element) coupled through a ball ramp actuated clutch. The ball ramp mechanism has a plurality of unidirectional variable depth grooves (ramps) and an actuation ring having single direction variable depth grooves at least partially opposed and substantially similar in geometry to those of the control ring. Examples of ball ramp actuator clutch systems are shown in U.S. Pat. Nos. 1,974,390; 2,861,225; 2,937,729; 3,000,479; 5,485,904 and 5,505,285. The actuation ring is prevented from counter rotating upon clutch lock-up in the vehicle coast mode through the use of one-way clutches. Two planetary gearsets (one of which is a partial planetary and functions as a large diameter one-way clutch) are used to allow the ball ramp actuator to increase the clamping force on the clutch friction disc both in drive and coast modes with no reduction in clamping force when transistioning from one mode to the other mode. Thus, using the present invention, the ball ramp mechanism of the present invention does not transition through the nonactivated state when the vehicle goes from a drive to a coast mode as with prior art devices and clutch slippage is reduced. Once the electromagnetic coil is energized the ball ramp mechanism can only increase clamping force independent of the vehicle operating condition.

The electromagnetic coil is used to activate a control clutch which frictionally couples the control ring through one of the planetary gearsets to the transmission input shaft. When energized by the coil, the ball ramp mechanism provides a clamping force on the clutch friction disc where the amplitude of the clamping force immediately increases whenever there exists a rotational speed differential between the flywheel and the transmission input shaft. According to the present invention, the amplitude of the clamping force is held at a given level or increased as long as the coil is energized by action of one-way clutches acting on individual planet gears in the planetary gearsets so that when the vehicle enters a coasting mode (where the engine is braking as opposed to driving the vehicle) the ball ramp actuator remains fully activated. Clutch slippage in the drive mode will cause the ball ramp mechanism to increase the clamping force on the clutch disc. Also, in the coasting mode, if for some reason there is clutch slippage, the planetary gearsets provide for additional relative rotation between the control ring and the actuation ring in the proper direction to increase the clamping force on the clutch friction discs.

One provision of the present invention is to prevent a ball ramp actuated clutch from disengaging when the input torque is reversed.

Another provision of the present invention is to prevent a ball ramp actuated clutch having unidirectional ramps from disengaging when the driveline torque is in a coast mode by locking the rotational orientation between a control ring and an actuation ring using one-way clutches acting on the planet gears of a planetary gearset.

Another provision of the present invention is to allow a ball ramp actuated driveline clutch having unidirectional ramps to increase its engagement level when the driveline torque is in a coast mode utilizing two planetary gearsets.

Another provision of the present invention is to allow a driveline clutch actuated by a ball ramp actuator having unidirectional ramps to increase its actuation force when the transferred driveline torque reverses direction utilizing two planetary gearsets where each planetary gear is supported on a one-way clutch nonrotatably mounted on a support pin attached to a carrier ring.

Still another provision of the present invention is to allow a driveline clutch actuated by a ball ramp actuator having unidirectional ramps to increase its actuation force when the transferred driveline torque reverses direction utilizing a planetary gearset and a partial planetary gearset, both having planetary gears acting between the control ring and the transmission input shaft where a plurality of one-way clutches prevent reverse rotation of the planetary gears.

DETAILED DESCRIPTION OF THE PREFERRED EMBODIMENT

Figure 1:
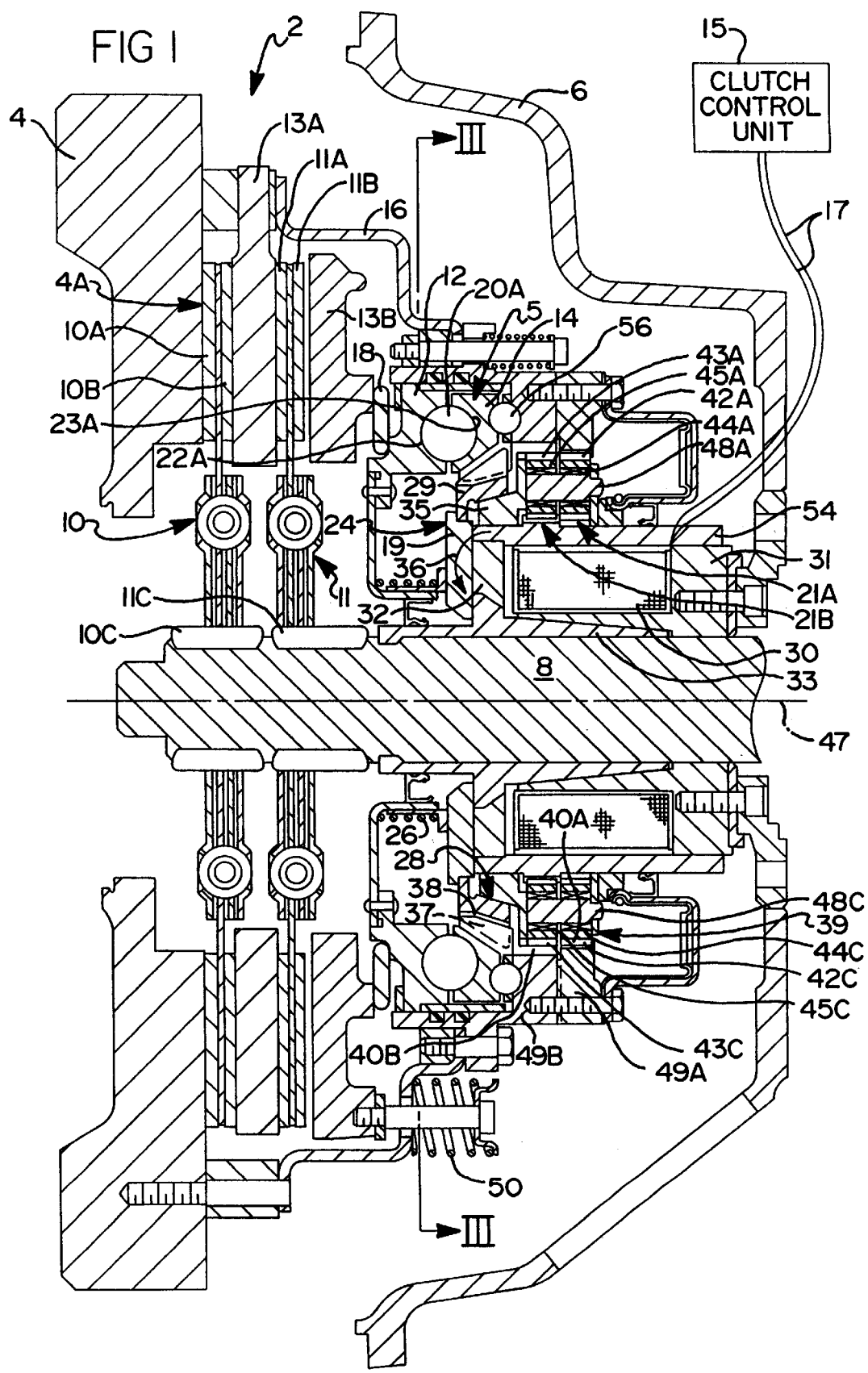
FIG. 1 is a partial cross-sectional view of the ball ramp actuator of the present invention.

For purposes of promoting the understanding of the principles of the invention, reference will now be made to the embodiment illustrated in the drawings and specific language will be used to describe the same. It will nevertheless be understood that no limitation on the scope of the invention is thereby intended, such alterations and further modifications in the illustrated device, and such further applications of the principles of the invention as illustrated therein being contemplated as would normally occur to one skilled in the art to which the invention relates.

Certain terminology will be used in the following description for convenience in reference only and will not be limiting. For example, the terms "forward" and "rearward" will refer to directions forward and rearward of the clutch assembly as normally mounted in a vehicle. The terms "rightward" and "leftward" will refer to directions in the drawings in connection with which the terminology is used. The terms "inwardly" and "outwardly" will refer to directions toward and away from respectively, the geometric center of the apparatus. The terms "upward" and "downward" will refer to directions as taken in the drawings in connection with which the terminology is used. All foregoing terms mentioned above include the normal derivatives and equivalents thereof.

Referring now to the drawings, which are not intended to limit the present invention, FIG. 1 is an axial cross-sectional view of a master driveline clutch assembly 2 of the type in which the present invention may be utilized. The main driveline clutch assembly 2 includes a flywheel 4 also referred to as an input element having a friction surface 4A rotatably driven by a prime mover (not shown) such as an internal combustion engine by its output crankshaft (not shown) which is coupled to a transmission (not shown) by a driveline clutch assembly 2 actuated by a ball ramp mechanism 5. A clutch bellhousing 6 surrounds the driveline clutch assembly 2 and supports the transmission including the transmission input shaft 8 also referred to as an output element which extends to nonrotatably engage a first clutch disc 10 having friction disc 10A and friction disc 10B through splines 10C at the left end of the transmission input shaft 8 of where the transmission input shaft 8 then extends rightward to drive the transmission gearing. Likewise, a second clutch disc 11 having friction disc 11A and friction disc 11B engages the transmission input shaft 8 through splines 11C. The first clutch disc 10 is clamped between the flywheel 4 and an intermediate pressure plate 13 while the second clutch disc 11 is clamped between the intermediate pressure plate 13A and a primary pressure plate 13B. An actuation ring 12, acts on the Belleville washer 18 to apply an axial force on the primary pressure plate 13B against the second clutch disc 11 and the intermediate pressure plate 13A against the first clutch disc 10 against the flywheel 4 at the flywheel friction surface 4A thereby transferring the rotational power from the prime mover to the transmission through the transmission input shaft 8 and eventually to the rest of the vehicle driveline.

In prior art systems, the clutch pressure plate is forced toward the flywheel using a plurality of loading springs. When the operator wishes to disengage the clutch disc, a mechanical release mechanism is activated by the operator's foot and leg overcoming the force of the springs thereby allowing the clutch disc to slip relative to the flywheel. It should be understood, however, that neither the activation springs nor the mechanical release mechanism are features of the present invention. According to the present invention, a ball ramp mechanism 5 incorporating an activation ring 12 and a control ring 14 separated by at least three rolling elements 20A riding in variable depth ramps or grooves 22A and 23A is used to force the actuation ring 12 toward the flywheel 4 which is controlled by the clutch control unit 15 electronically taking the place of an operator during transmission shifting sequences.

The clutch bellhousing 6 partially encloses the driveline clutch assembly 2 including the ball ramp mechanism 5 of the present invention. Ball ramp actuators that react the control ring 14 to ground are well known in the art and have been used to load transmission gear clutches as disclosed in U.S. Pat. No. 5,078,249, and differential clutch packs as disclosed in U.S. Pat. No. 5,092,825 where a ball ramp control ring is reacted against case ground by a coil or motor with gearing. In essence, relative rotational motion between the control ring 14 and the actuation ring 12 causes one or more rolling elements 20A, 20B and 20C (see FIG. 3), which can be spherical shaped elements or cylindrical rollers, to be moved along a like number of opposed ramps 22A, 22B and 22C formed in the control ring 14 and ramps 23A, 23B and 23C formed in the actuation ring 12 respectively. Ramps 22A,22B,22C,23A,23B and 23C have a variable axial depth which is unidirectional. Rotation of the control ring 14 relative to the actuation ring 12 causes the actuation ring 12 to move axially toward the flywheel 4 thereby clamping the first and second clutch discs 10 and 11 between the actuation ring 12 and the flywheel 4. The actuation ring 12 is nonrotatably connected to the pressure plate housing 16 but can move axially with respect thereto. FIGS. 6–8 illustrate this geometry with more detail and precision, reference to which is made subsequently.

Figure 2:
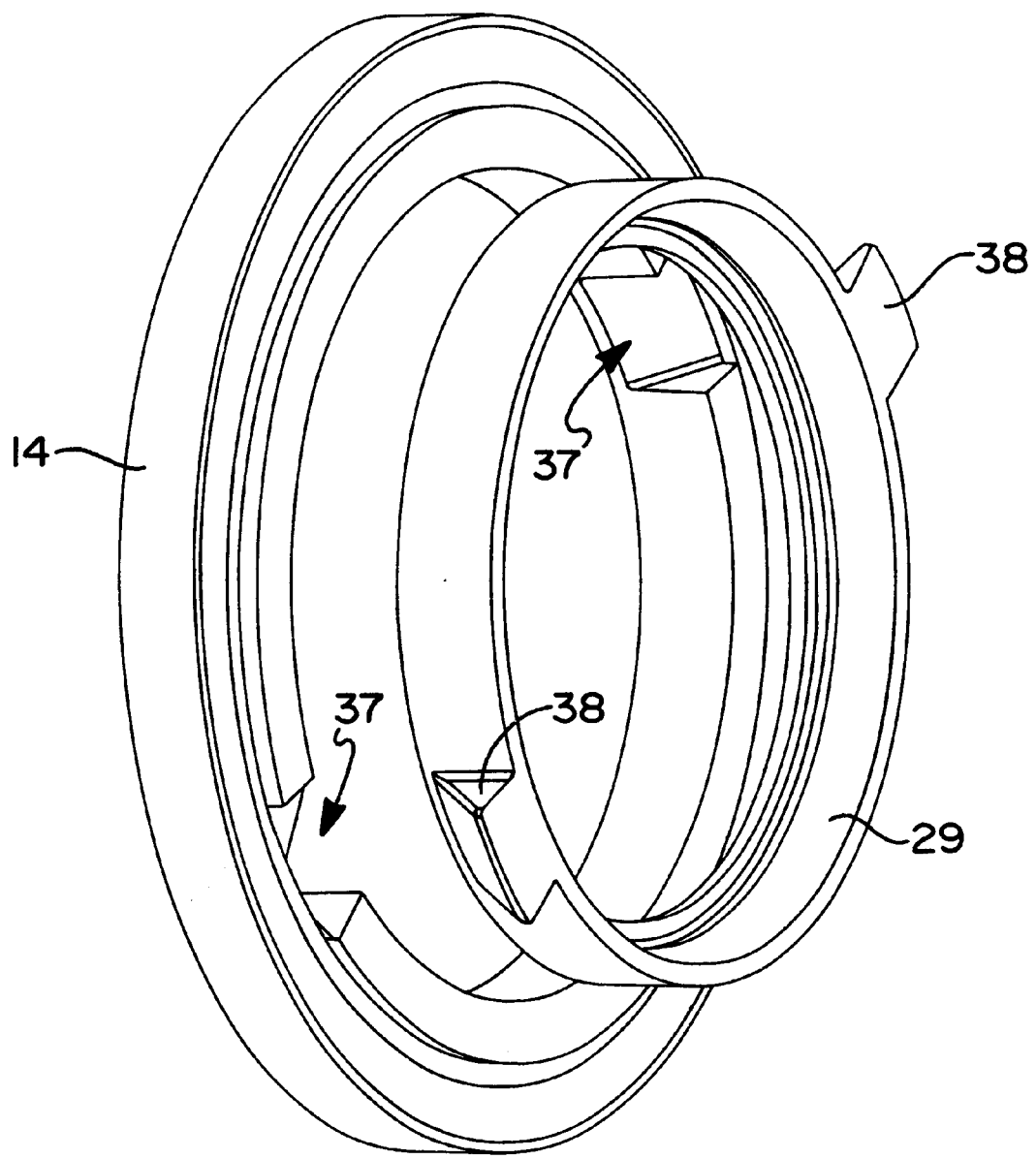
FIG. 2 is a partial perspective view of the clutch coupling of the present invention.

Thrust bearing 56, which can be any type of suitable bearing, reacts against the second support block 49B which is attached to the first support block 49A and is used to contain the axial forces generated by the ball ramp rolling elements 20A, 20B and 20C as they engage the ramps 22A, 22B, 22C, 23A, 23B and 23C in the control ring 14 and the actuation ring 12 respectively (see FIG. 2). In general a planetary gearset consists of an annulus, sun gear and at least three planetary gears. The first annulus 40A of the first planetary gearset 21A is attached to the first support block 49A which is attached to the flywheel 4 through the pressure plate housing 16. The second annulus 40B of the second planetary gearset 21B is supported by but rotates independently of the second support block 49B but is rotationally connected to the clutch ring 35. The sun gear 54 only engages the second planetary gearset 21B and the first planetary gearset 21A does not use a sun gear and functions as a large diameter one-way clutch. The first and second planet gears 42A and 43A are supported on support pin 48A through respective one-way clutches 44A and 45A. Carrier pins 48A, 48B, 48C and 48D are each attached to the carrier ring 39. The other planet gears 42B, 43B, 42C, 43C, 42D and 43D are supported on respective support pins 48B, 48C and 48D through respective one-way clutches 44B, 45B, 44C, 45C, 44D and 45D. When viewed from the cross-section 2—2, the first planet gears 42A are only allowed to rotate counterclockwise while the second planet gears 43A are only allowed to rotate clockwise. Thus, without a sun gear, the first planetary gearset 21A functions as a one-way clutch. The elements of the present invention generally encircle the transmission input shaft 8 and rotate about the axis of rotation 47.

The clutch coupling 24 consists of a cone clutch 28, one side of which is the clutch ring 35 of the second planetary gearset 21B and the second side is the clutch extension 29 which are frictionally coupled when the cone clutch 28 is energized. Drive channels 37 extend from the control ring 14 and rotationally engage drive flanges 38 extending from the clutch extension 29 which is attached to the control clutch plate 19 which form the clutch coupling 24. It is also anticipated that the drive flanges 38 could be formed on the control ring 14 and the drive channels 37 could be formed in the clutch extension 29. In this manner, the cone clutch 28 frictionally couples the control ring 14 to the clutch ring 35 (which is connected to the second annulus 40B) when the coil 30 is electrically energized by the clutch control unit 15 through leads 17 which electromagnetically attracts the control clutch plate 19 and loads the cone clutch 28. It is desirable to bond friction material to either the control clutch extension member 29 and/or the clutch ring 35 at the cone clutch 28 to provide for the desired torque transfer between these elements when the coil 30 is energized. The clutch extension member 29 uses the drive flanges 38 extending therefrom to rotationally drive one side of the cone clutch 28 without radial and axial alignment problems because of the manner in which the drive flanges 38 engage the drive channels 37. Without the use of the drive channels 37 and the drive flanges 38, the cone clutch 28 would tend to bind due to the production tolerances and wear of the components that make up the clutch coupling 24.

FIG. 2 is partial perspective view of the clutch coupling 24 of the present invention illustrating the shape and orientation of one embodiment of the drive channels 37 and the mating drive flanges 38 formed on the control ring 14 and the clutch extension 29 respectively. The cone clutch 28 requires some degree of free-play of the components to allow for production tolerances and wear. The drive flanges 38 engage respective drive channels 37 to transfer rotational motion while allowing the clutch extension 29 to align with the clutch ring 35 for proper operation of the cone clutch 28. An number of drive channels 37 and drive flanges 38 could be utilized to provide this function.

Referring once again to FIG. 1, the control ring 14 contains the ramps 22A, 22B and 23C and is frictionally rotatably connected to the clutch ring 35 when the coil 30 is energized by action of the clutch coupling 24. The control clutch member 19 is drawn against the coil pole 32 when the coil 30 is energized by the clutch control unit 15 through connectors 17. The annular electrical coil 30 encircles the transmission input shaft 8 and is supported by the coil support 31 attached to the clutch bellhousing 6. The electrical coil 30 is positioned in close proximity to the coil pole 32 where the coil pole 32 is nonrotatably supported on the transmission input shaft 8 on the splined sleeve 33. Thus, the splined sleeve 33 and the coil pole 32 and the sun gear 54 all rotate with the transmission input shaft 8. The electrical coil 30 is positioned to be partially enclosed by the coil pole 32 and is separated from it by a small air gap. The coil 30 is mounted to the clutch bellhousing 6 and therefore held stationary while the coil pole 32 rotates according to the rotation of the input shaft 8. The coil 30 generates an electromagnetic flux illustrated by arrows 36 in FIG. 1 which travel through the coil pole 32 into the control clutch member 19 and back through the coil pole 32 into the coil 30. This electromagnetic flux creates a force tending to draw the clutch member 19 into the coil pole 32 thereby creating a frictional force through contact of the clutch extension member 29 on clutch ring 35 and a torque into the planetary gearsets 21A and 21B which apply a resulting torque in the control ring 14 (assuming a rotational speed differential between the flywheel 4 and the transmission input shaft 8). The ball ramp mechanism 5 is activated in the proper manner through the first and second planetary gearsets 21A, 21B which rotate the control ring 14 in a locking direction when the vehicle is in either a coast or drive mode.

When the clutch discs 10 and 11 are unclamped or start to slip due to excessive torque supplied by the prime mover (engine) through the flywheel 4, there is relative rotation between the control ring 14 and the actuation ring 12 thereby forcing the rings 12 and 14 axially further apart (as described in further detail infra) thereby increasing the clamping force of the actuation ring 12 on the clutch discs 10 and 11 at the friction pads 10A, 10B, 11A and 11B between the main pressure plate 13A and the intermediate pressure plate 13A and the flywheel 4. This occurs through a small range of rotational motion of the control ring 14 relative to the actuation ring 12 and provides an automatic, virtually instant, clamping force adjustment should any relative rotation occur between the flywheel 4 and the transmission input shaft 8 by action of the ball ramp mechanism 5.

According to the present invention, once the clutch assembly 2 is locked-up, the coil pole 32 rotates at the same speed as the flywheel 4 and minimal parasitic electrical power is required to be delivered to the coil 30 to maintain lock-up of clutch assembly 2. Using the teaching of the prior art, the control ring 14 can be reacted against a ground surface, such as the clutch bellhousing 6, although continuous slipping would occur between the control ring 14 resulting in high parasitic energy losses and no automatic activation of the ball ramp mechanism 5 upon clutch slip. As illustrated in the present application, by attaching the control ring 14 to the transmission input shaft 8 through the first and second planetary gearsets 21A and 21B controlled by action of one-way clutches 44A, 44C, 45A, 45C, clutch slip will further energize the ball ramp mechanism 5 independent of the operational mode of the vehicle thereby minimizing clutch slip. The reaction time to even minimal slipping of the clutch discs 10 and 11 when in either the vehicle drive or coast mode using the present invention is virtually instantaneous since slippage of the clutch discs 10 and 11 results in the immediate relative motion between the actuation ring 12, and the control ring 14 through the frictionally locked clutch coupling 24 and the first and second planetary gearsets 21A and 21B on the control ring 14 side and through the pressure plate housing 16 to the actuation ring 12 resulting in further activation of the ball ramp mechanism 5. The actuation ring 12 is rotationally coupled to the clutch pressure plate housing 16 which is in turn connected to the flywheel 4 all rotating together.

The bias spring 26 pre-loads the control clutch plate 19 toward the coil pole 32 to minimize air gap effect to provide a smooth engagement when the coil 30 is first energized. Without the bias spring 26 (which is illustrated as an expanding coil spring but could be any suitable expanding device) the cone clutch 28 would tend to overengage due to the magnetic efforts as the air gaps between the control clutch plate 19 and the coil pole 32 was closed since at a given electrical current level into the coil 30 the force would increase very rapidly as the air gap was closed. Without a sophisticated electrical control system the force transferred into the cone clutch 28 would exceed the desired level for a smooth activation of the driveline clutch assembly 2.

A plurality of pressure plate springs 50 act to pull the ball ramp mechanism 5 including the actuation ring 12 away from the clutch friction discs 10 and 11 and the flywheel 4 by acting as spring elements between the pressure plate housing 16 and the actuation ring 12 thereby biasing the actuation ring 12 away from the flywheel 4. The pressure plate housing 16 is attached to the flywheel 4 such that the actuation ring 12 rotates with the flywheel 4 but can move axially relative to the flywheel 4 as controlled by action of the ball ramp mechanism 5 acting to compress the pressure plate springs 50.

Axial forces generated by the ball ramp mechanism 5 are transmitted by the thrust bearing 56 into the second blocks 49B which is attached to the flywheel 4 through the pressure plate housing 16. In the opposite direction, the force generated by the ball ramp mechanism 5 is transmitted to the clutch discs 10 and 11 and the flywheel 4. It should be noted that any number of clutch discs could be utilized including only one clutch disc without the intermediate pressure plate 13A.

Figure 3:
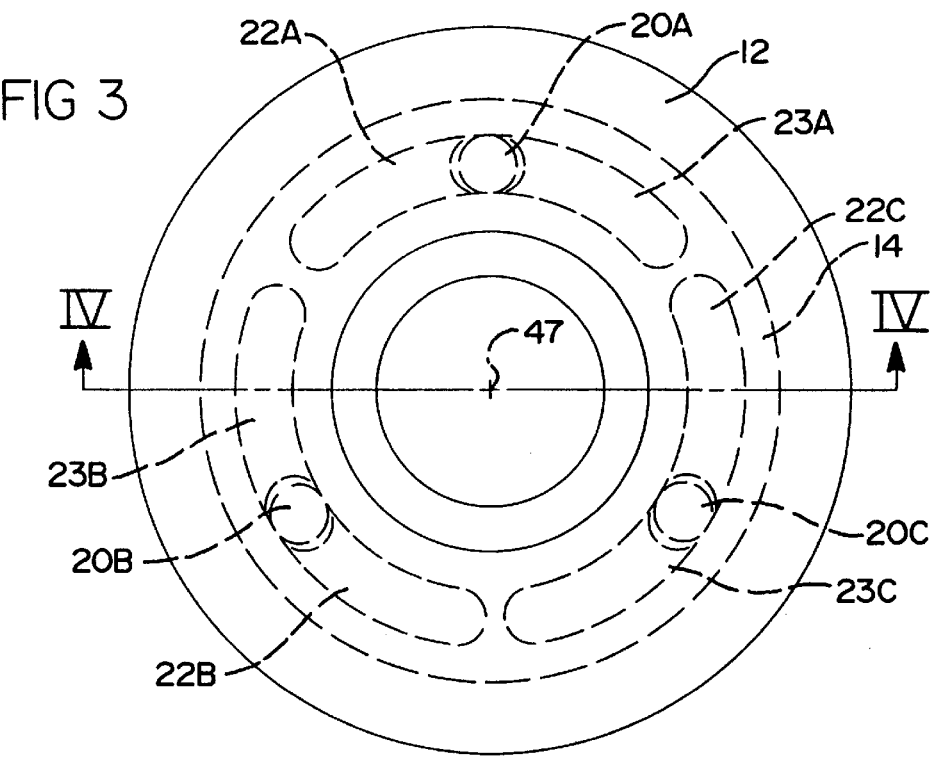
FIG. 3 is an axial cross-sectional view of the ball ramp mechanism of the present invention taken along line III—III of FIG. 1.
Figure 4:
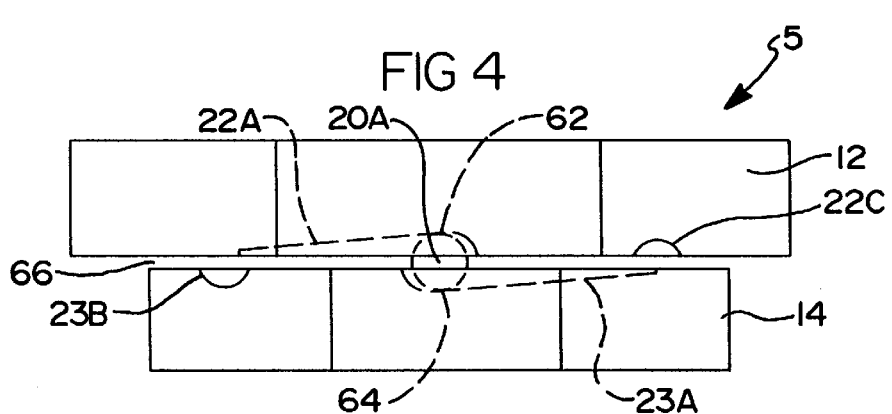
FIG. 4 is a cross-sectional view of the ball ramp mechanism of the present invention taken along line IV—IV of FIG. 3 with the ball ramp mechanism in a nonenergized state.
Figure 5:
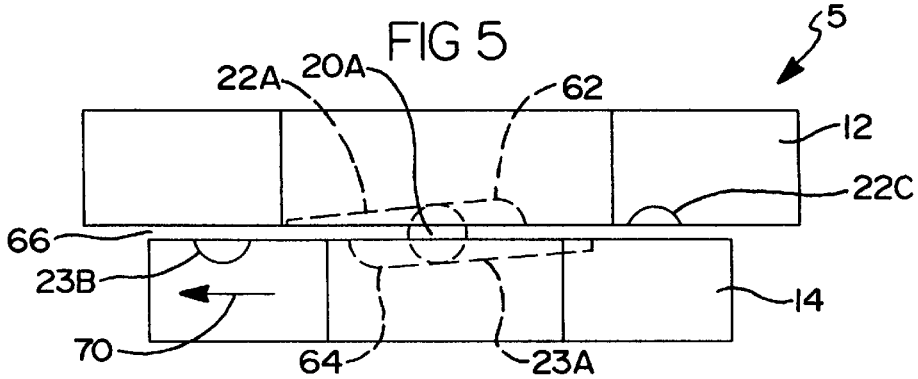
FIG. 5 is a cross-sectional view of the ball ramp mechanism of the present invention taken along line IV—IV of FIG. 3 with the ball ramp mechanism in an energized state.

Referring now to FIGS. 3, 4 and 5 to describe the operation of the ball ramp mechanism 5, a cross-sectional view of the ball ramp mechanism 5 is shown in FIG. 3 and views taken along line VII—VII of the actuation ring 12 and the control ring 14 separated by a spherical element 20A are shown in FIGS. 4 and 5. Three spherical rolling elements 20A, 20B and 20C are spaced approximately 120° apart rolling in three ramps 22A, 22B and 22C having a variable axial depth respectively as the control ring 14 is rotated relative to the actuation ring 12. Any number of spherical rolling elements 20A, 20B and 20C and respective ramps 22A, 22B, 22C, 23A, 23B and 23C could be utilized depending on the desired rotation and axial motion of the ball ramp mechanism 5. It is mandatory to employ at least three spherical rolling elements 20A, 20B and 20C traveling on a like number of identical equally spaced opposed ramps 22A, 22B, 22C, 23A, 23B and 23C formed respectively in both the control ring 14 and the actuation ring 12 to provide axial and radial stability to the control ring 14 and the actuation ring 12. As mentioned previously, any type of rolling elements could be utilized such as a ball or a cylindrical roller. The actuation ring 12 is shown which rotates with the flywheel 4, the pressure plate housing 16 and the first and second blocks 49A, 49B turning about axis of rotation 47 coincident with the axis of rotation of the transmission input shaft 8.

Three semi-circular, circumferential ramps 23A, 23B and 23C are shown formed in the face of the actuation ring 12 with corresponding identical opposed ramps 22A, 22B and 22C formed in the face of the control ring 14. The control ring 14 and the actuation ring 12 are made of a high strength steel and the unidirectional tapered ramps 22A, 22B, 22C, 23A, 23B and 23C carburized and hardened to $R_C$55–60. The ramps 22A, 22B, 22C, 23A, 23B and 23C are tapered in depth as more clearly shown in FIG. 4 by references to ramps 22A and 23A and circumferentially extend for approximately 120° (actually less than 120° to allow for a separation section between the ramps). The separation 66 between the control ring 14 and the actuation ring 12 is determined by the rotational orientation between the two corresponding opposed ramps such as 22A and 23A where the spherical rolling element 20A rolls on both ramps 22A and 23A as the control ring 14 is rotated relative to the actuation ring 12 on the same axis of rotation. In a substantially identical manner, rolling element 20B rolls on both ramps 22B and 23B and rolling element 20C rolls on both ramps 22C and 23C. The relative rotation forces the two rings 14, 12 axially apart or allows them to come closer together as determined by the position of the rolling elements 20A, 20B and 20C or their respective ramp pairs 22A, 23A and 22B, 23B and 22C, 23C thereby providing an axial movement for clamping and releasing the clutch disc 10 between the actuation ring 12 and the flywheel 4.

FIG. 4 illustrates the rotational orientation of the control ring 14 and the actuation ring 12 when the carrier ring 48 is at a minimum when the ramps 22A and 23A are at one extreme in alignment and the spherical element 20A is in the deepest section of the ramps 22A and 23A. Assuming there is a rotational speed difference the flywheel 4 and the transmission input shaft 8, upon energizing the coil 30, the control ring 14 is rotated relative to the actuation ring 12 by application of a rotational torque input through the clutch coupling 24 and the ramps 22A and 23A move relative to one another causing the spherical element 20A to roll on each of the ramp surfaces 22A and 23A moving to a different position on both ramps 22A and 23A thereby forcing the control ring 14 and the actuation ring 12 apart to a wider separation 66 as shown in FIG. 5. A similar separation force is generated by rolling element 20B rolling on ramp surfaces 22B and 23B and by rolling element 20C rolling on ramp surfaces 22C and 23C. The rotation of the control ring 14 is clearly illustrated by reference to FIGS. 4 and 5 by the relative shift in position of reference points 62 and 64 from directly opposed in FIG. 4 to an offset position in FIG. 5 caused by rotation of the control ring 14 in the direction of the arrow 70. This increase in axial displacement can be used for a variety of applications, and especially driveline clutches, since the force level relative to the torque applied to the control ring 14 is quite high, typically a ratio of 100:1. This can be used as illustrated in this application to load an actuation ring 12 against clutch discs 10 and 11 and flywheel 4 in a vehicle driveline. Additional illustrative details of operation of a ball ramp actuator can be found by reference to U.S. Pat. No. 4,805,486.

If the flywheel 4 is rotating at the same speed as the transmission input shaft 8, even if the coil 30 is energized, the control ring 14 rotates at the same speed as the actuation ring 12 and no additional axial force is generated by the ball ramp mechanism 5 since there is no relative rotation between the control ring 14 and the actuation ring 12. Assuming the coil 30 remains energized thereby electromagnetically tying the control ring 14 to the transmission input shaft 8 through the clutch coupling 24, coil pole 32 and the first and second planetary gearsets 21A and 21B, according to the present invention, any relative rotation between the flywheel 4 and the transmission input shaft 8, results in relative rotation between the control ring 14 and the actuation ring 12 in a direction which causes the spherical elements 20A, 20B and 20C to further increase the separation 66 between the control ring 14 and the actuation ring 12 thereby generating additional clamping force by the actuation ring 12 so as to use the power of the flywheel to increase the lock-up force on the clutch disc 10.

According to the present invention, the vehicle driveline clutch actuator can be used to couple a rotating input shaft to an output shaft where the input shaft would be analogous to the flywheel 4 and the output shaft would be analogous to the transmission input shaft 8 as shown in FIG. 1. The present invention would prevent the ball ramp mechanism 5 from retracting and disengaging the clutch discs 10 and 11 so long as the coil 30 was energized thereby providing a friction coupling between the input shaft (flywheel) and the output shaft (transmission input shaft) irregardless of the direction of the torque transfer.

This invention has been described in great detail, sufficient to enable one skilled in the art to make and use the same. Various alterations and modifications of the invention will occur to those skilled in the art upon a reading and understanding of the foregoing specification, and it is intended to include all such alterations and modifications as part of the invention, insofar as they come within the scope of the appended claims.

We claim:

1. A clutch assembly for rotationally coupling two rotating elements comprising:

an input element driven by a prime mover and rotating about an axis of rotation;

an output element rotationally coupled to said input element using said clutch assembly;

a ball ramp mechanism for generating an axial movement comprising; an annular control ring having an axis of rotation, said control ring having a plurality of circumferential control ramps formed in a first face of said control ring, said control ramps varying in axial depth, an equivalent number of rolling elements one occupying each of said control ramps, an actuation ring having an axis of rotation coaxial with said axis of rotation of said control ring, said actuation ring having a plurality of actuation ramps substantially identical in number, shape and radial position to said control ramps where said actuation ramps at least partially oppose said control ramps and where each of said rolling elements is contained between one of said actuation ramps and a respective control ramp, said control ring being axially and rotationally moveably disposed relative to said actuation ring;

a coil for creation of an electromagnetic field in a coil pole upon introduction of an electrical current in said coil;

a clutch coupling having a clutch plate positioned adjacent to said coil pole disposed to apply a rotational torque to said control ring through drive flanges engaging mating drive channels to activate said ball ramp mechanism upon creation of an electromagnetic field by said coil;

biasing means for creating a force on a clutch plate tending to move said clutch plate toward said coil pole; and a cone clutch frictionally coupling said output element to said control ring where said cone clutch is disposed between a clutch extension and a clutch ring, said clutch ring having at least one drive flange formed on said clutch extension and a mating drive channel being formed in said control ring, said clutch ring being rotationally coupled to said output element through at least one planetary gearset.

2. The clutch assembly of claim 1, wherein said clutch plate is forced against said coil pole by a spring.

3. The clutch assembly of claim 1, further comprising a Belleville washer interposed between said actuation ring and a pressure plate.

* * * * *